(12) United States Patent
Takahashi et al.

(10) Patent No.: US 12,301,141 B2
(45) Date of Patent: May 13, 2025

(54) MOTOR CONTROL DEVICE

(71) Applicant: ADVICS CO., LTD., Kariya (JP)

(72) Inventors: Tomoya Takahashi, Kasugai (JP);
Hikaru Kawamura, Nagoya (JP)

(73) Assignee: ADVICS CO., LTD., Kariya (JP)

( * ) Notice: Subject to any disclaimer, the term of this patent is extended or adjusted under 35 U.S.C. 154(b) by 325 days.

(21) Appl. No.: 17/266,347

(22) PCT Filed: Aug. 29, 2019

(86) PCT No.: PCT/JP2019/033906
§ 371 (c)(1),
(2) Date: Feb. 5, 2021

(87) PCT Pub. No.: WO2020/045568
PCT Pub. Date: Mar. 5, 2020

(65) Prior Publication Data
US 2021/0320603 A1   Oct. 14, 2021

(30) Foreign Application Priority Data

Aug. 31, 2018   (JP) ................. 2018-163148

(51) Int. Cl.
*H02P 21/18*   (2016.01)
*H02P 6/185*   (2016.01)
(Continued)

(52) U.S. Cl.
CPC .............. *H02P 21/18* (2016.02); *H02P 6/185* (2013.01); *H02P 21/22* (2016.02); *H02P 21/26* (2016.02)

(58) Field of Classification Search
CPC .......... H02P 21/18; H02P 6/185; H02P 21/22; H02P 21/26; H02P 23/24; H02P 6/183; H02P 21/00; H02P 2203/11
See application file for complete search history.

(56) References Cited

U.S. PATENT DOCUMENTS 5,122,716 A * 6/1992 Kashihara ................. H02P 7/05
   318/257
6,445,154 B1   9/2002 Toyozawa et al.
(Continued)

FOREIGN PATENT DOCUMENTS

EP   2424105 A2 *   2/2012   .............. H02P 21/04
EP   2784928 A2 *  10/2014   .............. H02P 21/22
(Continued)

OTHER PUBLICATIONS

International Search Report (PCT/ISA/210) issued on Oct. 21, 2019, by the Japanese Patent Office as the International Searching Authority for International Application No. PCT/JP2019/033906.
(Continued)

*Primary Examiner* — Bickey Dhakal
(74) *Attorney, Agent, or Firm* — BUCHANAN INGERSOLL & ROONEY PC

(57) ABSTRACT

A motor control device includes: a rotation control unit that rotates a rotor of a brushless motor by supplying a power thereto; a rotation direction determining unit that determines a rotation direction of the rotor accompanying the power supplied to the brushless motor by the rotation control unit; and a magnetic pole distinguishing unit that distinguishes magnetic poles of the rotor based on an orientation of a current flowing through each of coils due to the power supplied to the brushless motor by the rotation control unit and the rotation direction of the rotor determined by the rotation direction determining unit.

18 Claims, 4 Drawing Sheets

(51) Int. Cl.
*H02P 21/22* (2016.01)
*H02P 21/26* (2016.01)

(56) References Cited

U.S. PATENT DOCUMENTS

| | | | | |
|---|---|---|---|---|
| 10,505,475 | B1* | 12/2019 | Peng | H02P 6/26 |
| 11,303,239 | B2* | 4/2022 | Takahashi | H02P 21/18 |
| 2002/0163319 | A1* | 11/2002 | Kaneko | H02P 21/04 |
| | | | | 903/903 |
| 2005/0104582 | A1* | 5/2005 | Toyozawa | H02P 1/46 |
| | | | | 324/207.25 |
| 2008/0111516 | A1* | 5/2008 | Inokuma | H02P 21/14 |
| | | | | 318/799 |
| 2008/0218111 | A1* | 9/2008 | Okamura | H02P 21/0089 |
| | | | | 318/453 |
| 2013/0093375 | A1* | 4/2013 | Cao | H02P 6/183 |
| | | | | 318/400.33 |
| 2014/0009147 | A1 | 1/2014 | Taniguchi et al. | |

FOREIGN PATENT DOCUMENTS

| | | | | | |
|---|---|---|---|---|---|
| JP | 3408468 | B2 | | 5/2003 | |
| JP | 2008220089 | A | * | 9/2008 | H02P 21/14 |
| JP | 2011-030393 | A | | 2/2011 | |
| JP | 2014011822 | A | | 1/2014 | |

OTHER PUBLICATIONS

Written Opinion (PCT/ISA/237) issued on Oct. 21, 2019, by the Japanese Patent Office as the International Searching Authority for International Application No. PCT/JP2019/033906.

* cited by examiner

MOTOR CONTROL DEVICE

TECHNICAL FIELD

The present disclosure relates to a motor control device that controls a brushless motor having a salient polarity.

BACKGROUND ART

PTL 1 describes an example of a motor control device that distinguishes magnetic poles of a rotor of a brushless motor having a salient polarity. In this control device, a voltage in a positive orientation is applied in a direction of an estimated d-axis, and a first d-axis current component, which is a current component flowing in the direction of the estimated d-axis, is acquired, the estimated d-axis being an axis estimated to be a d-axis, and an estimated q-axis being an axis orthogonal to the estimated d-axis in rotation coordinates of vector control. Further, after the acquisition of the first d-axis current component is completed, a voltage in a negative orientation is applied in the direction of the estimated d-axis, and a second d-axis current component, which is a current component flowing in the direction of the estimated d-axis, is acquired. Then, the magnetic poles of the rotor are distinguished based on a comparison of inductance in the direction of the estimated d-axis estimated from a magnitude of the first d-axis current component and inductance in the direction of the estimated d-axis estimated from a magnitude of the second d-axis current component.

CITATION LIST

Patent Literature

PTL 1: JP-A-2014-11822

SUMMARY

Technical Problem

During distinguishing of magnetic poles of a rotor, it is required to shorten a time required for distinguishing.

Solution to Problem

A motor control device for solving the above problems includes: a rotation control unit configured to rotate a rotor of a brushless motor by supplying power; a rotation direction determining unit configured to determine a rotation direction of the rotor accompanying the power supplied to the brushless motor by the rotation control unit; and a magnetic pole distinguishing unit configured to distinguish magnetic poles of the rotor based on an orientation of a current flowing through a coil of the brushless motor due to the power supplied to the brushless motor by the rotation control unit and the rotation direction of the rotor determined by the rotation direction determining unit.

A relationship between the orientation of the current flowing through the coil of the brushless motor and the rotation direction of the rotor accompanying the power supplied to the brushless motor changes depending on the magnetic poles of the rotor. According to the above configuration, the rotor is rotated by supplying the power to the brushless motor. Then, the magnetic poles of the rotor are distinguished based on a determining result of the orientation of the current flowing through the coil of the brushless motor due to the power and the rotation direction of the rotor accompanying the power supplied to the brushless motor. Moreover, when the magnetic poles are to be distinguished, it is not necessary to pass the current in one direction through the coil and then pass the current in the other direction through the coil. Therefore, it is possible to shorten a time required for distinguishing the magnetic poles of the rotor.

DESCRIPTION OF EMBODIMENTS

Hereinafter, an embodiment of a motor control device will be described with reference to FIGS. 1 to 5.

Figure 1:
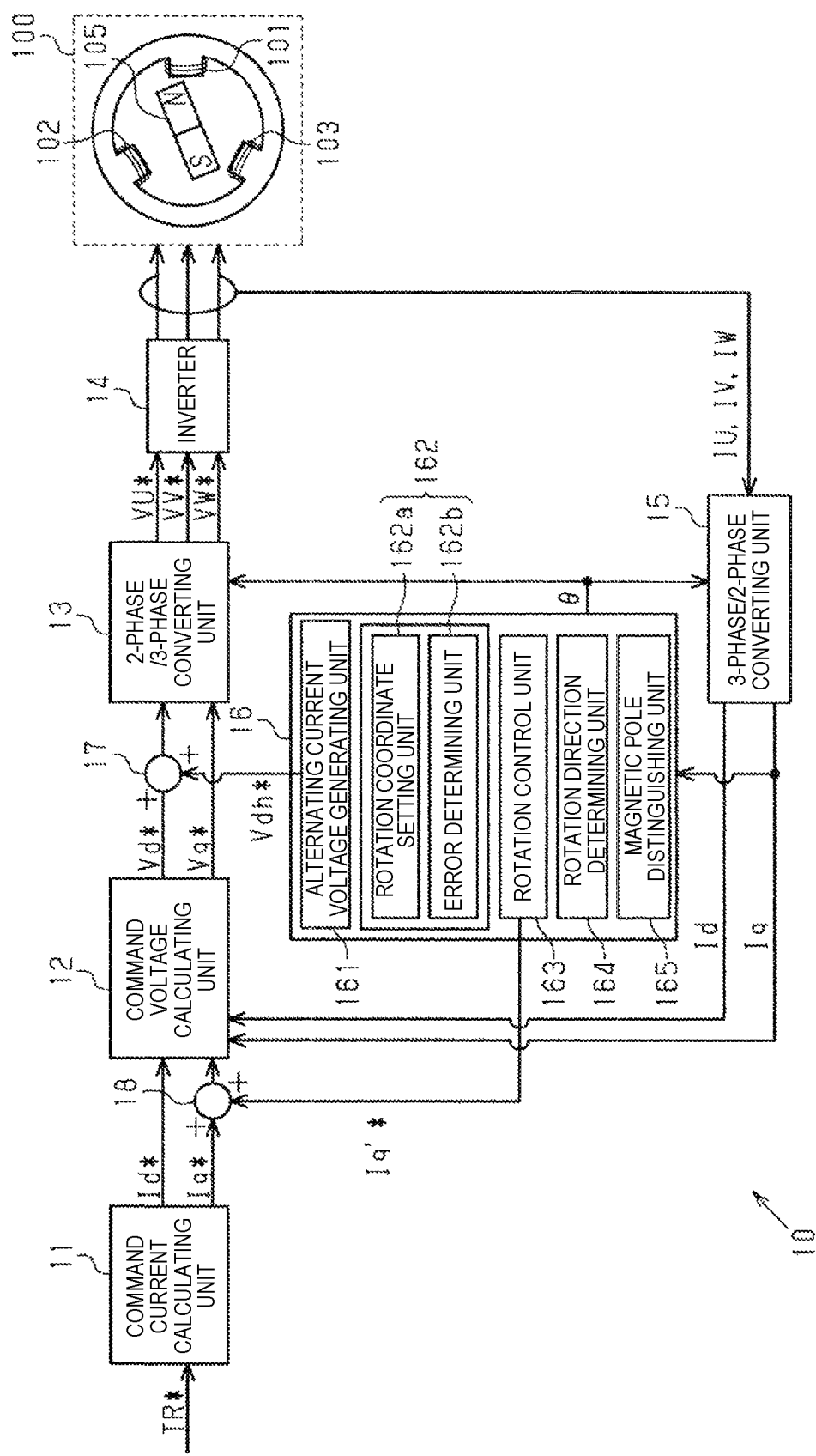
FIG. 1 is a schematic configuration diagram showing a motor control device according to an embodiment and a brushless motor controlled by the motor control device.

FIG. 1 shows a motor control device 10 according to the present embodiment and a brushless motor 100 controlled by the motor control device 10. The brushless motor 100 is used as a power source for discharging braking fluid in an in-vehicle braking device. The brushless motor 100 is a permanent magnet embedded synchronous motor. The brushless motor 100 includes coils 101, 102, and 103 of a plurality of phases (U-phase, V-phase, and W-phase), and a rotor 105 having a salient polarity. Examples of the rotor 105 include a 2-pole rotor in which one N pole and one S pole are magnetized.

The motor control device 10 drives the brushless motor 100 by vector control. Such the motor control device 10 includes a command current calculating unit 11, a command voltage calculating unit 12, a 2-phase/3-phase converting unit 13, an inverter 14, a 3-phase/2-phase converting unit 15, and a rotor position estimating unit 16.

The command current calculating unit 11 calculates a d-axis command current Id* and a q-axis command current Iq* based on a required torque TR* for the brushless motor 100. The d-axis command current Id* is a command value of a current component in a direction of a d-axis in rotation coordinates of the vector control. The q-axis command current Iq* is a command value of a current component in a direction of a q-axis in the rotation coordinates. The d-axis and the q-axis are orthogonal to each other in the rotation coordinates.

The command voltage calculating unit 12 calculates a d-axis command voltage Vd* by feedback control based on the d-axis command current Id* and a d-axis current Id. The d-axis current Id is a value indicating a current component in a direction of an estimated d-axis in a current vector generated on the rotation coordinates by supplying power to each of the coils 101 to 103 of the brushless motor 100. Further, the command voltage calculating unit 12 calculates a q-axis command voltage Vq* by feedback control based on the q-axis command current Iq* and a q-axis current Iq. The q-axis current Iq is a value indicating a current component in a direction of an estimated q-axis in the current vector generated on the rotation coordinates by supplying the power to each of the coils 101 to 103.

The estimated d-axis is an axis estimated to be the d-axis among control axes on the rotation coordinates of the vector control. A real d-axis on the rotation coordinates is called an actual d-axis. Further, a real q-axis on the rotation coordinates is called an actual q-axis, and an axis estimated to be the q-axis among the control axes on the rotation coordinates is called the estimated q-axis.

The 2-phase/3-phase converting unit 13 respectively converts the d-axis command voltage Vd* and the q-axis command voltage Vq* into a U-phase command voltage VU*, a V-phase command voltage VV*, and a W-phase command voltage VW* based on a rotor rotation angle θ, which is a position (that is, a rotation angle) of the rotor 105. The U-phase command voltage VU* is a command value of a voltage applied to the U-phase coil 101. The V-phase command voltage VV* is a command value of a voltage applied to the V-phase coil 102. The W-phase command voltage VW* is a command value of a voltage applied to the W-phase coil 103.

The inverter 14 includes a plurality of switching elements. The inverter 14 generates a U-phase signal by the U-phase command voltage VU* received from the 2-phase/3-phase converting unit 13 and an on/off operation of the switching elements. Further, the inverter 14 generates a V-phase signal by the received V-phase command voltage VV* and the on/off operation of the switching elements. Further, the inverter 14 generates a W-phase signal by the received W-phase command voltage VW* and the on/off operation of the switching elements. Then, the U-phase signal is input to the U-phase coil 101, the V-phase signal is input to the V-phase coil 102, and the W-phase signal is input to the W-phase coil 103 of the brushless motor 100.

A U-phase current IU, which is a current flowing through the U-phase coil 101 of the brushless motor 100, a V-phase current IV, which is a current flowing through the V-phase coil 102, and a W-phase current IW, which is a current flowing through the W-phase coil 103, are input to the 3-phase/2-phase converting unit 15. Then, the 3-phase/2-phase converting unit 15 converts, based on the rotor rotation angle θ, the U-phase current IU, the V-phase current IV, and the W-phase current IW into the d-axis current Id, which is the current component in the direction of the d-axis, and the q-axis current Iq, which is the current component in the direction of the q-axis.

The rotor position estimating unit 16 estimates the rotor rotation angle θ. Such the rotor position estimating unit 16 includes an alternating current voltage generating unit 161, a control axis correcting unit 162, a rotation control unit 163, a rotation direction determining unit 164, and a magnetic pole distinguishing unit 165 as functional units.

Figure 3A:
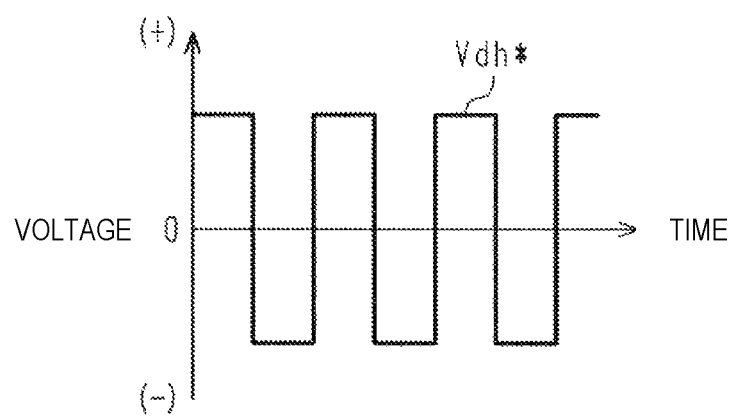
FIG. 3A is a graph showing a disturbance voltage signal.

The alternating current voltage generating unit 161 generates a disturbance voltage signal Vdh* that vibrates a voltage at a high frequency as shown in FIG. 3A when the direction of the estimated d-axis is to be brought closer to a direction of the actual d-axis, and executes disturbance output processing that outputs the disturbance voltage signal Vdh* to a first adder 17. When the disturbance output processing is executed by the alternating current voltage generating unit 161, the disturbance voltage signal Vdh* is added to the d-axis command voltage Vd* calculated by the command voltage calculating unit 12, and the added d-axis command voltage Vd* is input to the 2-phase/3-phase converting unit 13.

According to FIG. 1, when the disturbance output processing is being executed by the alternating current voltage generating unit 161, the control axis correcting unit 162 corrects the direction of the estimated d-axis and executes processing for making the direction of the estimated d-axis approximately match the direction of the actual d-axis. Such control axis correcting unit 162 includes a rotation coordinate setting unit 162a and an error determining unit 162b.

The rotation coordinate setting unit 162a corrects the direction of the estimated d-axis and executes correction processing for bringing the direction of the estimated d-axis closer to the direction of the actual d-axis. That is, in the correction processing, the rotation coordinate setting unit 162a detects an estimated q-axis high-frequency current Iqh, which is a high-frequency component of the q-axis current Iq, by passing the q-axis current Iq received from the 3-phase/2-phase converting unit 15 through a bandpass filter. Then, in the correction processing, the control axis correcting unit 162 corrects directions of the control axes, that is, the direction of the estimated d-axis and the direction of the estimated q-axis by using the detected estimated q-axis high-frequency current Iqh.

Figure 2:
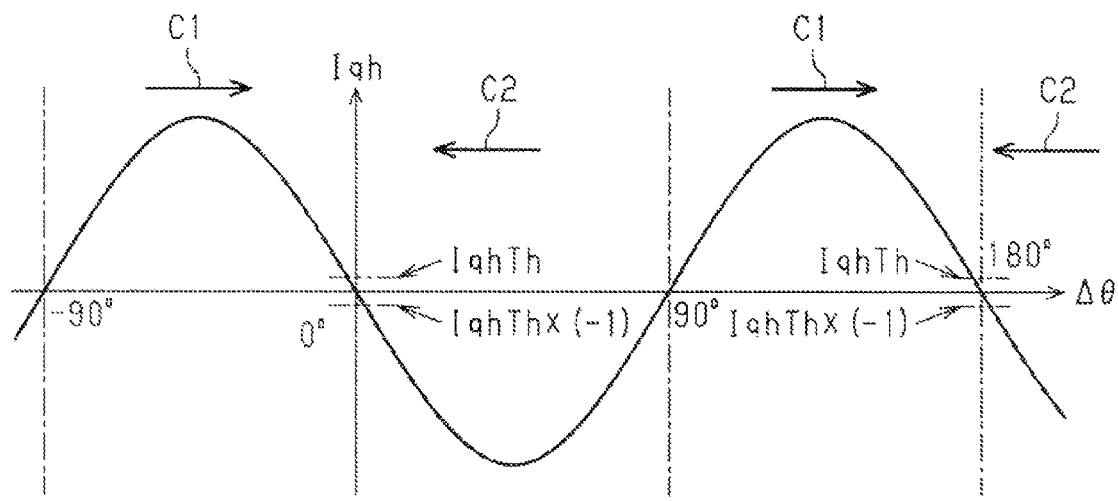
FIG. 2 is a graph showing a transition of an estimated q-axis high-frequency current when control axes are continuously changed on rotation coordinates of vector control.

An example of the correction processing will be described with reference to FIG. 2. A solid line in FIG. 2 shows a transition of the estimated q-axis high-frequency current Iqh when the directions of the control axes are continuously changed. When the disturbance output processing is executed, a voltage vector based on the disturbance voltage signal Vdh* is generated on the estimated d-axis. Then, since the rotor 105 of the brushless motor 100 has a salient polarity, a current vector declined to the actual d-axis side with respect to the direction of the estimated d-axis is generated in the rotation coordinates. The current component in the direction of the estimated q-axis in the current vector corresponds to the estimated q-axis high-frequency current Iqh. Therefore, it can be said that the estimated q-axis high-frequency current Iqh is a numerical value of the current vector in the direction of the estimated q-axis. That is, an absolute value of the estimated q-axis high-frequency current Iqh corresponds to a magnitude of the current component in the direction of the estimated q-axis. Further, the positive and negative of the estimated q-axis high-frequency current Iqh represents an orientation, that is, a positive orientation or a negative orientation of the current component flowing in the direction of the estimated q-axis. In the present embodiment, when the estimated q-axis high-frequency current Iqh is a positive value, the orientation of the current component in the direction of the estimated d-axis is positive. On the other hand, when the estimated q-axis high-frequency current Iqh is a negative value, the orientation of the current component in the direction of the estimated d-axis is negative.

In FIG. 2, a phase difference Δθ is a phase difference between an orientation of the actual d-axis and an orientation of the estimated d-axis. Specifically, a value acquired by subtracting the orientation of the actual d-axis from the orientation of the estimated d-axis is the phase difference Δθ.

Then, as shown in FIG. 2, in the correction processing, when the detected estimated q-axis high-frequency current Iqh is a positive value, since the current component in the direction of the estimated d-axis is positive, the rotation coordinate setting unit 162a corrects the direction of the estimated d-axis to a first direction C1 in the figure, which is a direction for advancing the direction of the estimated d-axis. On the other hand, in the correction processing, when the detected estimated q-axis high-frequency current Iqh is a negative value, since the current component in the direction of the estimated d-axis is negative, the rotation coordinate setting unit 162a corrects the direction of the estimated d-axis to a second direction C2 in the figure, which is a direction for retarding the direction of the estimated d-axis.

The error determining unit 162b determines whether a d-axis error is within a predetermined magnetic pole determining permission range, the d-axis error being an error between the direction of the actual d-axis and the direction of the estimated d-axis. For example, when the absolute value of the estimated q-axis high-frequency current Iqh is greater than a predetermined threshold IqhTh, since it can be determined that the magnitude of the current component in the direction of the estimated q-axis in the current vector generated on the rotation coordinates is greater than the threshold IqhTh, the error determining unit 162b determines that the d-axis error is not within the magnetic pole determining permission range. On the other hand, when the absolute value of the estimated q-axis high-frequency current Iqh is equal to or less than the threshold IqhTh, since it can be determined that the magnitude of the current component in the direction of the estimated q-axis in the current vector generated on the rotation coordinates is equal to or less than the threshold IqhTh, the error determining unit 162b determines that the d-axis error is within the magnetic pole determining permission range. When it is determined that the d-axis error is within the magnetic pole determining permission range, the phase difference Δθ is a value close to 0° or a value close to 180°.

Then, when the error determining unit 162b determines that the d-axis error is within the magnetic pole determining permission range, the rotation coordinate setting unit 162a completes the correction processing.

The correction processing executed in the present embodiment uses the salient polarity of the rotor 105, and cannot distinguish orientations of magnetic poles of the rotor 105. Therefore, when the correction processing is completed, an orientation of the N pole of the rotor 105 may be deviated by "180°".

Figure 3B:
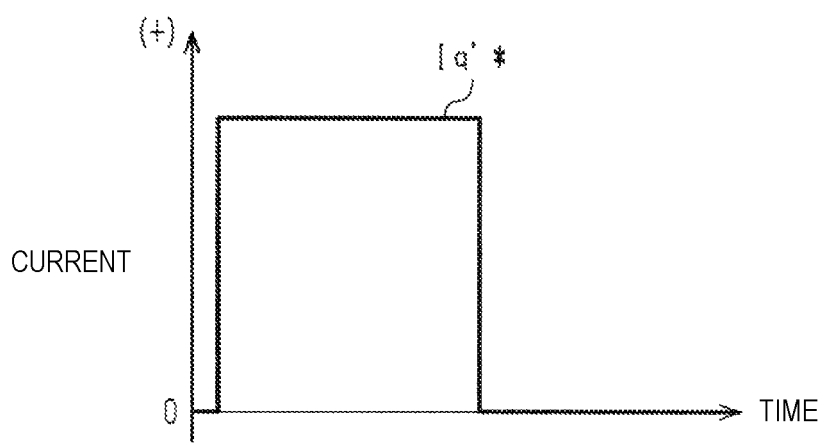
FIG. 3B is a graph showing a pulse signal.

Returning to FIG. 1, the rotation control unit 163 executes rotation processing for rotating the rotor 105 by supplying power. That is, in the rotation processing, the rotation control unit 163 outputs a pulse signal Iq'* as shown in FIG. 3B to a second adder 18 such that a current vector is generated in the direction of the estimated q-axis. When the rotation processing is executed by the rotation control unit 163, the pulse signal Iq'* is added to the q-axis command current Iq* calculated by the command current calculating unit 11, and the added q-axis command current Iq* is input to the command voltage calculating unit 12. As a result, the rotor 105 is rotated in a direction corresponding to the orientation of the current vector generated in the direction of the estimated q-axis by executing the rotation processing.

In the rotation processing in the present embodiment, the rotor 105 is rotated by adding the pulse signal Iq'* to the q-axis command current Iq*. However, without being limited thereto, in the rotation processing, the rotor 105 may be rotated by adding a signal to the required torque TR* or the q-axis command voltage Vq* instead of the q-axis command current Iq*.

Returning to FIG. 1, the rotation direction determining unit 164 determines a rotation direction of the rotor 105 accompanying the execution of the rotation processing by the rotation control unit 163, that is, the power supplied to the brushless motor 100 by the rotation control unit 163.

The magnetic pole distinguishing unit 165 executes magnetic pole distinguishing processing for distinguishing the magnetic poles of the rotor 105 based on an orientation of a current of the pulse signal Iq'* generated by executing the rotation processing using the rotation control unit 163 and the rotation direction of the rotor 105 determined by the rotation direction determining unit 164. There is a correlation between the orientation (that is, the positive orientation or the negative orientation) of the current of the pulse signal Iq'* generated by the rotation processing and an orientation of a current flowing through each of the coils 101 to 103 of the brushless motor 100 due to the power supplied to the brushless motor 100 by the rotation control unit 163. Therefore, it can be said that the magnetic pole distinguishing processing is processing to be executed based on the orientation of the current flowing through each of the coils 101 to 103 due to the power supplied to the brushless motor 100 by the rotation control unit 163 and the rotation direction of the rotor 105 determined by the rotation direction determining unit 164.

Next, a processing routine executed by the rotor position estimating unit 16 will be described with reference to FIGS. 4 and 5. The processing routine is executed at the start of driving the brushless motor 100.

In the first step S11 of the processing routine, pre-correction processing, which is one of the correction processing, is executed. The pre-correction processing is correction processing executed before the rotor 105 is rotated by supplying power to the brushless motor 100 accompanying the execution of the rotation processing by the rotation control unit 163. Specifically, the rotation coordinate setting unit 162a instructs the alternating current voltage generating unit 161 to execute the disturbance output processing prior to the start of the pre-correction processing. When the execution of the disturbance output processing is started by the instruction and the disturbance voltage signal Vdh* is input to the first adder 17, the rotation coordinate setting unit 162a starts the pre-correction processing. Then, when the error determining unit 162b determines that the d-axis error is within the magnetic pole determining permission range, the rotation coordinate setting unit 162a completes the pre-rotation processing and instructs the alternating current voltage generating unit 161 to stop the disturbance output processing. When the disturbance voltage signal Vdh* is no longer input to the first adder 17, the processing proceeds to the next step S12.

In step S12, the rotation control unit 163 executes first rotation processing, which is one of the rotation processing. That is, in the first rotation processing, the rotation control unit 163 rotates the rotor 105 by generating the pulse signal Iq'* whose orientation of the current is positive and outputting the pulse signal Iq'* to the second adder 18.

Subsequently, in step S13, post-correction processing, which is one of the correction processing, is executed. The post-correction processing is correction processing executed after the rotor 105 is rotated by supplying power to the brushless motor 100 accompanying the execution of the rotation processing by the rotation control unit 163. That is, the rotation coordinate setting unit 162a instructs the alternating current voltage generating unit 161 to execute the disturbance output processing prior to the start of the post-correction processing. When the execution of the disturbance output processing is started by the instruction and the disturbance voltage signal Vdh* is input to the first adder 17, the rotation coordinate setting unit 162a starts the post-correction processing. Then, when the error determining unit 162b determines that the d-axis error is within the magnetic pole determining permission range, the rotation coordinate setting unit 162a completes the post-correction processing and instructs the alternating current voltage generating unit 161 to stop the disturbance output processing. When the disturbance voltage signal Vdh* is no longer input to the first adder 17, the processing proceeds to the next step S14.

In step S14, the rotation direction determining unit 164 determines the rotation direction of the rotor 105 accompanying the execution of the first rotation processing, and calculates a rotation amount Rmt of the rotor 105. That is, before the first rotation processing is executed, when the phase difference Δθ is approximately 0° as shown by a white square in FIG. 5, if the first rotation processing is executed, the orientation of the actual d-axis changes to an advance angle side by the rotation of the rotor 105. As a result, the phase difference Δθ becomes small as shown by a black square in FIG. 5. In this case, when the post-correction processing is executed, the estimated q-axis high-frequency current Iqh changes from a positive value toward zero. That is, at the start of the post-correction processing, the orientation of the current component in the direction of the estimated d-axis is positive.

Figure 5:
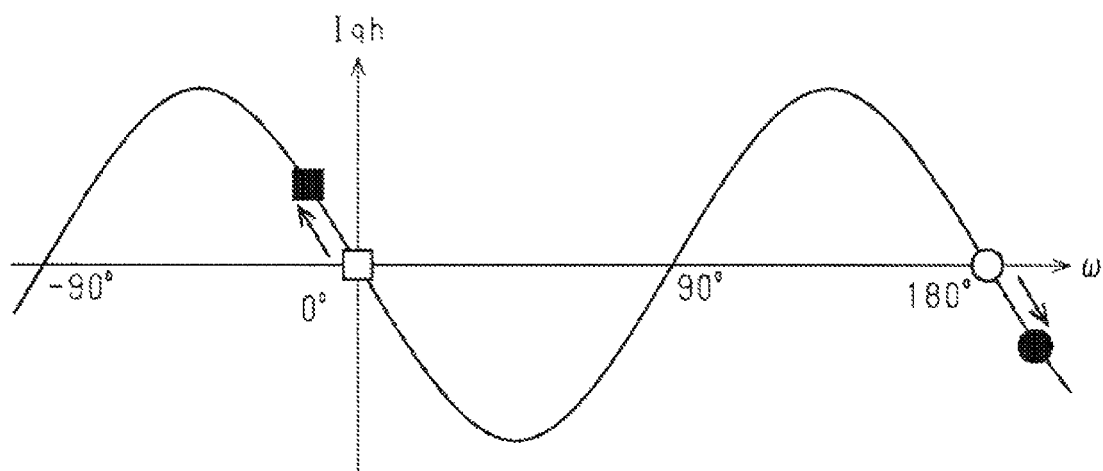
FIG. 5 is a schematic diagram showing how a phase difference changes due to execution of rotation processing.

On the other hand, before the first rotation processing is executed, when the phase difference Δθ is approximately "180°" as shown by a white circle in FIG. 5, if the first rotation processing is executed, the orientation of the actual d-axis is rotated to a retard angle side by the rotation of the rotor 105. As a result, the phase difference Δθ becomes large as shown by a black circle in FIG. 5. In this case, when the post-correction processing is executed, the estimated q-axis high-frequency current Iqh changes from a negative value toward zero. That is, at the start of the post-correction processing, the orientation of the current component in the direction of the estimated d-axis is negative.

Therefore, the rotation direction determining unit 164 determines the rotation direction of the rotor 105 accompanying the execution of the first rotation processing based on a correction direction of the control axes accompanying the execution of the post-correction processing. Specifically, when the correction direction of the control axes accompanying the execution of the post-correction processing is the second direction C2, which is the direction in which the phase difference Δθ becomes small, the rotation direction determining unit 164 determines that the rotation direction of the rotor 105 accompanying the execution of the first rotation processing is a negative rotation direction. On the other hand, when the correction direction of the control axes accompanying the execution of the post-correction processing is the first direction C1, which is the direction in which the phase difference Δθ becomes large, the rotation direction determining unit 164 determines that the rotation direction of the rotor 105 accompanying the execution of the first rotation processing is a positive rotation direction. The positive rotation direction is an opposite direction of the negative rotation direction of the rotor 105. That is, the rotation direction determining unit 164 determines the rotation direction of the rotor 105 based on first information acquired by executing the post-correction processing, that is, a change direction of the estimated q-axis high-frequency current Iqh.

Further, the rotation direction determining unit 164 calculates the rotation amount Rmt of the rotor 105 accompanying the execution of the first rotation processing based on the absolute value of the estimated q-axis high-frequency current Iqh at the start of the post-correction processing, that is, the magnitude of the current component in the direction of the estimated q-axis. Before the start of the first rotation processing, the estimated q-axis high-frequency current Iqh is approximately zero. When the first rotation processing is executed from this state and the rotor 105 is rotated, the absolute value of the estimated q-axis high-frequency current Iqh gradually becomes large. That is, there is a correlation between the estimated q-axis high-frequency current Iqh immediately after the start of the post-correction processing and the rotation amount Rmt of the rotor 105 accompanying the execution of the first rotation processing. Therefore, the rotation direction determining unit 164 calculates the rotation amount Rmt such that the rotation amount Rmt of the rotor 105 becomes large as the absolute value of the estimated q-axis high-frequency current Iqh at the start of the post-correction processing becomes large.

Then, in the next step S15, it is determined whether the calculated rotation amount Rmt is equal to or less than a specified amount RmtTh. The specified amount RmtTh is set to a value that can determine whether the rotation amount Rmt is small in order to distinguish the magnetic poles of the rotor 105. Then, when it is determined that the rotation amount Rmt is not equal to or less than the specified amount RmtTh (S15: NO), since it can be determined that the rotor 105 is sufficiently rotated by executing the first rotation processing, the processing proceeds to step S19 described later. On the other hand, when it is determined that the rotation amount Rmt is equal to or less than the specified amount RmtTh (S15: YES), the processing proceeds to the next step S16.

In step S16, the rotation control unit 163 executes second rotation processing, which is one of the rotation processing. The second rotation processing is processing for rotating the rotor 105 in a direction opposite to that when the first rotation processing is executed. That is, in the second rotation processing, the rotation control unit 163 rotates the rotor 105 by generating the pulse signal Iq'* whose orientation of the current is negative and outputting the pulse signal Iq'* to the second adder 18. In the present embodiment, when the rotation amount Rmt of the rotor 105 accompanying the execution of the first rotation processing is equal to or less than the specified amount RmtTh, the rotation control unit 163 rotates the rotor 105 by supplying power to the brushless motor 100 in a manner of rotating the rotor 105 in the opposite direction, that is, by executing the second rotation processing.

Subsequently, in step S17, the post-correction processing is executed in the same manner as in step S13. Then, when it is determined that the d-axis error is within the magnetic pole determining permission range, the post-rotation processing is completed, and the disturbance voltage signal Vdh* is no longer input to the first adder 17, the processing proceeds to the next step S18.

In step S18, the rotation direction determining unit 164 determines the rotation direction of the rotor 105 accompanying the execution of the second rotation processing. That is, before the second rotation processing is executed, when the phase difference Δθ is approximately 0°, if the second rotation processing is executed, the orientation of the actual d-axis is rotated to the retard angle side. As a result, the phase difference Δθ becomes large. In this case, when the post-correction processing is executed, the estimated q-axis high-frequency current Iqh changes from a negative value toward zero. That is, at the start of the post-correction processing, the orientation of the current in the direction of the estimated q-axis is negative.

On the other hand, before the second rotation processing is executed, when the phase difference Δθ is approximately 180°, if the second rotation processing is executed, the orientation of the actual d-axis is rotated to the advance angle side. As a result, the phase difference Δθ becomes small. In this case, when the post-correction processing is executed, the estimated q-axis high-frequency current Iqh changes from a positive value toward zero. That is, at the start of the post-correction processing, the orientation of the current in the direction of the estimated d-axis is positive.

Therefore, the rotation direction determining unit 164 determines the rotation direction of the rotor 105 accompanying the execution of the second rotation processing based on the correction direction of the control axes accompanying the execution of the post-correction processing. Specifically, when the correction direction of the control axes accompanying the execution of the post-correction processing is the first direction C1 in which the phase difference Δθ becomes large, the rotation direction determining unit 164 determines that the rotation direction of the rotor 105 accompanying the execution of the second rotation processing is the positive rotation direction. On the other hand, when the correction direction of the control axes accompanying the execution of the post-correction processing is the second direction C2 in which the phase difference Δθ becomes small, the rotation direction determining unit 164 determines that the rotation direction of the rotor 105 accompanying the execution of the second rotation processing is the negative rotation direction. Then, when the determination of the rotation direction of the rotor 105 is completed, the processing proceeds to the next step S19.

In step S19, the magnetic pole distinguishing unit 165 executes the magnetic pole distinguishing processing. That is, in the magnetic pole distinguishing processing, when it is determined that the rotation direction of the rotor 105 accompanying the execution of the first rotation processing is the positive rotation direction, the magnetic pole distinguishing unit 165 determines that the phase difference Δθ is approximately 0° and an estimated position of the N pole of the rotor 105 coincides with an actual position of the N pole. On the other hand, in the magnetic pole distinguishing processing, when it is determined that the rotation direction of the rotor 105 accompanying the execution of the first rotation processing is the negative rotation direction, the magnetic pole distinguishing unit 165 determines that the phase difference Δθ is approximately 180° and the estimated position of the N pole of the rotor 105 is opposite to the actual position of the N pole.

Further, in the magnetic pole distinguishing processing, when it is determined that the rotation direction of the rotor 105 accompanying the execution of the second rotation processing is the negative rotation direction, the magnetic pole distinguishing unit 165 determines that the phase difference Δθ is approximately 0° and the estimated position of the N pole of the rotor 105 coincides with the actual position of the N pole. On the other hand, in the magnetic pole distinguishing processing, when it is determined that the rotation direction of the rotor 105 accompanying the execution of the second rotation processing is the positive rotation direction, the magnetic pole distinguishing unit 165 determines that the phase difference Δθ is approximately 180° and the estimated position of the N pole of the rotor 105 is opposite to the actual position of the N pole.

Then, when the execution of the magnetic pole distinguishing processing is completed, the processing routine is completed.

Next, functions and effects of the present embodiment will be described.

When the start of driving of the brushless motor 100 is instructed, the pre-correction processing is executed, and the phase difference Δθ between the orientation of the actual d-axis and the orientation of the estimated d-axis becomes approximately 0° or approximately 180°. Then, since it is determined that the d-axis error is within the magnetic pole determining permission range, the first rotation processing is executed. That is, power is supplied to the brushless motor 100, such that a current vector in the positive orientation is generated in the direction of the estimated q-axis. Then, the rotor 105 is rotated in a direction corresponding to the phase difference Δθ at that time and a voltage in the positive orientation.

As shown by the white square in FIG. 5, when the phase difference Δθ becomes approximately 0° due to the pre-correction processing, if the first rotation processing is executed, the phase difference Δθ becomes small by the rotation of the rotor 105. That is, the estimated q-axis high-frequency current Iqh changes to the positive side. On the other hand, as shown by the white circle in FIG. 5, when the phase difference Δθ becomes approximately 180° due to the pre-correction processing, if the first rotation processing is executed, the phase difference Δθ becomes large by the rotation of the rotor 105. That is, the estimated q-axis high-frequency current Iqh changes to the negative side.

That is, when the rotor 105 is rotated by executing the first rotation processing, the rotation direction is a direction corresponding to the phase difference Δθ before the first rotation processing is executed.

Then, when the first rotation processing is completed, the post-correction processing is executed. When the phase difference Δθ becomes approximately 0° due to the pre-correction processing, the direction of the estimated d-axis is corrected by executing the post-correction processing, such that the phase difference Δθ approaches 0°. At this time, the estimated q-axis high-frequency current Iqh changes from a positive value toward zero. On the other hand, when the phase difference Δθ becomes approximately 180° due to the pre-correction processing, the orientation of the estimated d-axis is corrected by executing the post-correction processing, such that the phase difference Δθ approaches 180°. At this time, the estimated q-axis high-frequency current Iqh changes from a negative value toward zero.

During the execution of the post-correction processing, the orientation of the current component in the direction of the estimated d-axis until the estimated q-axis high-frequency current Iqh becomes zero correlates with the rotation direction of the rotor 105 accompanying the execution of the first rotation processing. Therefore, in the present embodiment, the rotation direction of the rotor 105 due to the execution of the first rotation processing can be determined by monitoring a change in the estimated q-axis high-frequency current Iqh during the execution of the post-correction processing.

Therefore, in the present embodiment, the magnetic poles of the rotor 105 are distinguished based on the orientation of the current flowing through each of the coils 101 to 103 by executing the first rotation processing, that is, the orientation of the current of the pulse signal Iq'* generated by executing the first rotation processing and the rotation direction of the rotor 105 due to the execution of the first rotation processing.

If the rotor 105 can be sufficiently rotated when the pulse signal Iq'* in the positive orientation is transmitted in the direction of the estimated q-axis, the magnetic poles of the rotor 105 can be distinguished without transmitting the pulse signal Iq'* in the negative orientation in the direction of the estimated q-axis. That is, when the rotation amount Rmt of the rotor 105 accompanying the execution of the first rotation processing is greater than the specified amount RmtTh, the magnetic poles of the rotor 105 can be distinguished without executing the second rotation processing. Therefore, a time required for distinguishing the magnetic poles of the rotor 105 can be shortened.

Further, a distinguishing method of the magnetic poles of the rotor 105 described in JP-A-2014-11822 is used as a distinguishing method of a comparative example. As the distinguishing method of the comparative example, when the magnetic poles of the rotor 105 are distinguished based on a comparison between inductance in the positive orientation of the estimated d-axis and inductance in the negative orientation of the estimated d-axis, in order to clarify a magnitude relationship of the inductance, it is necessary to pass a large current through each of the coils 101 to 103. In this respect, in the present embodiment, the magnetic poles of the rotor 105 are distinguished by passing a current sufficient to rotate the rotor 105 through each of the coils 101 to 103. A magnitude of the current flowing through each of the coils 101 to 103 at this time may be smaller than that of the distinguishing method of the comparative example. Therefore, the power consumption required for the distinguishing can be reduced as compared with the case where the magnetic poles of the rotor 105 are distinguished by the distinguishing method of the comparative example.

In the present embodiment, the following effects can be further acquired.

(1) It is assumed that the rotation processing is executed without executing the pre-correction processing. In this case, the rotation processing may be executed in a state where the phase difference $\Delta\theta$ is 90° or in a state where the phase difference $\Delta\theta$ is minus 90°. In this case, the rotor 105 cannot be rotated even if the pulse signal Iq'* is input in the direction of the estimated q-axis. If the rotor 105 cannot be rotated in this way, the magnetic poles of the rotor 105 cannot be distinguished. In this respect, in the present embodiment, the rotation processing is executed after the pre-correction processing is executed. As a result, the rotation processing can be executed in a state where the phase difference $\Delta\theta$ is approximately 0° or in a state where the phase difference $\Delta\theta$ is approximately 180°. Therefore, occurrence of an event that the rotor 105 does not rotate when the rotation processing is executed can be prevented.

Further, as described above, in order to improve the distinguishing accuracy of the magnetic poles of the rotor 105, it is desirable that the rotation amount Rmt of the rotor 105 is greater than the specified amount RmtTh. When the d-axis error is a value outside the magnetic pole determining permission range, in order to make the rotation amount Rmt greater than the specified amount RmtTh, it is necessary to input a relatively large pulse signal Iq'* in the direction of the estimated q-axis. In this respect, in the present embodiment, the rotation processing is executed after the d-axis error is set to a value within the magnetic pole determining permission range by executing the pre-correction processing. When the d-axis error is within the magnetic pole determining permission range, a q-axis error, which is an error between the direction of the estimated q-axis and the direction of the actual q-axis, is within a predetermined range. That is, it can be determined that the q-axis error is small. Therefore, the rotor 105 can be rotated with a relatively small current. Incidentally, the q-axis error here is the same value as the d-axis error.

(2) After the rotation processing is executed, the orientation of the estimated d-axis is corrected by executing the post-correction processing such that the estimated q-axis high-frequency current Iqh is approximately zero. Therefore, the subsequent motor control can be performed with the phase difference $\Delta\theta$ as small as possible.

(3) Even power is supplied to the brushless motor 100 to rotate the rotor 105 in one of the positive rotation direction and the negative rotation direction, if a load applied to the brushless motor 100 at that time is large, the rotor 105 may hardly rotate. That is, even the first rotation processing is executed, if the load applied to the brushless motor 100 is large, the rotation amount Rmt of the rotor 105 may not be greater than the specified amount RmtTh. In this case, when the rotation direction of the rotor 105 is determined based on information acquired by executing the first rotation processing, the determination accuracy is low, and the magnetic poles of the rotor 105 may not be accurately distinguished.

In this respect, in the present embodiment, when the rotation amount Rmt of the rotor 105 is not greater than the specified amount RmtTh even though the first rotation processing is executed, the second rotation processing is executed. In the second rotation processing, the power is supplied to the brushless motor 100 to rotate the rotor 105 in the other rotation direction among the positive rotation direction and the negative rotation direction. Then, when the rotation amount Rmt of the rotor 105 accompanying the execution of the second rotation processing becomes greater than the specified amount RmtTh, it can be determined that the determination accuracy of the rotation direction of the rotor 105 is sufficiently secured. Therefore, the magnetic poles of the rotor 105 are distinguished based on the positive and negative orientations of the pulse signal Iq'* received in the direction of the estimated q-axis during the second rotation processing and the rotation direction of the rotor 105 due to the execution of the second rotation processing. Accordingly, a decrease in the distinguishing accuracy of the magnetic poles can be prevented.

(4) In the present embodiment, the rotation direction of the rotor 105 is determined based on first information acquired during the execution of the post-correction processing. Therefore, it is not necessary to provide processing for determining the rotation direction of the rotor 105 separately from the post-correction processing, which prevents a long period of time required for distinguishing the magnetic poles of the rotor 105.

The above-described embodiment can be modified and implemented as follows. The above-described embodiment and the following modifications can be implemented in combination with each other as long as the embodiment and the modifications do not have technical contradiction.

Figure 4:
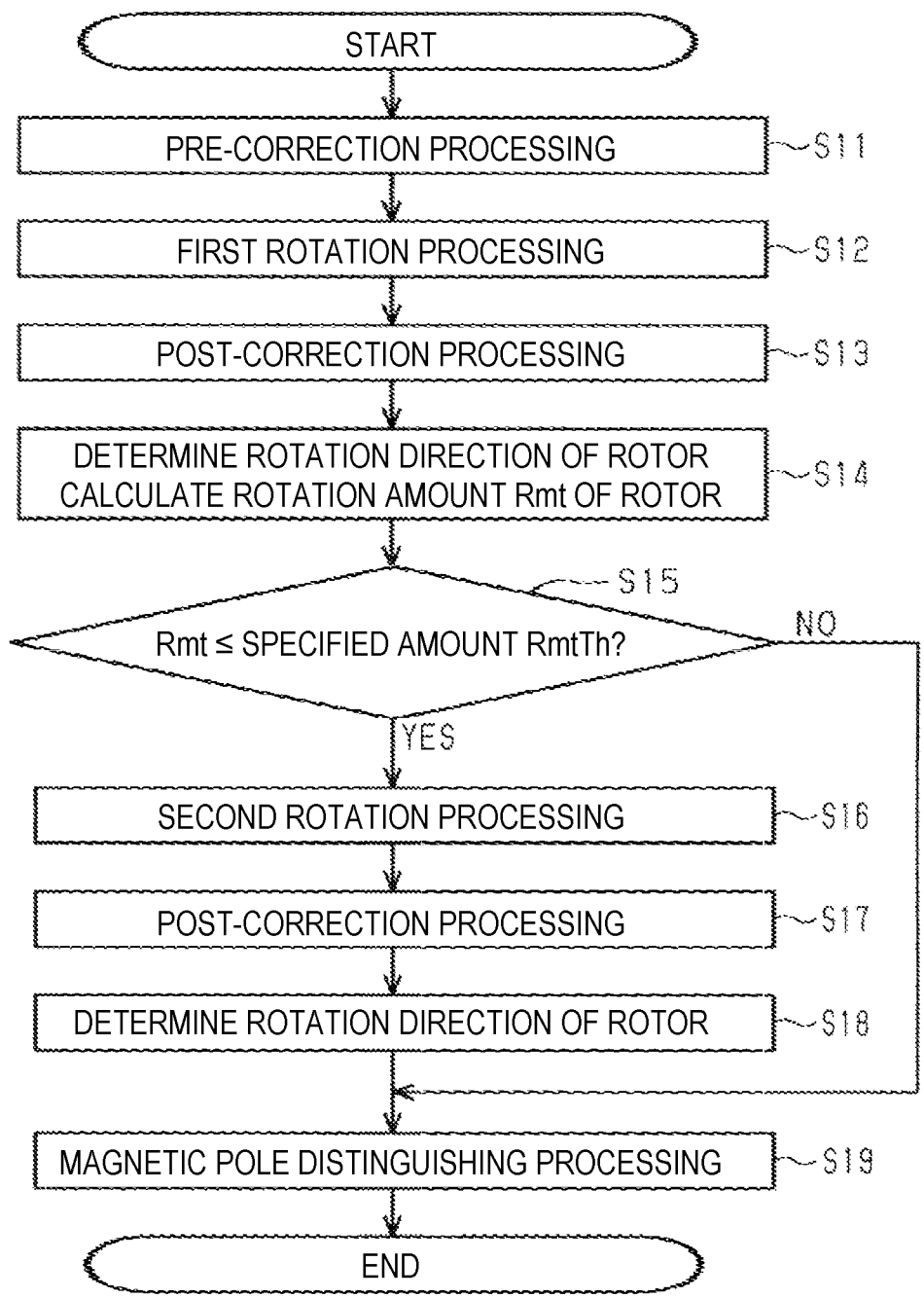
FIG. 4 is a flowchart showing a processing routine executed to distinguish magnetic poles of a rotor.

In the processing routine shown in FIG. 4, when the rotation amount Rmt of the rotor 105 accompanying the execution of the first rotation processing is equal to or less than the specified amount RmtTh (S15: YES), the second rotation processing may be executed after the pre-correction processing is executed again.

Even if the rotation amount Rmt of the rotor 105 accompanying the execution of the first rotation processing is equal to or less than the specified amount RmtTh, the second rotation processing may not be executed. In this case, for example, the first rotation processing may be repeated a plurality of times. Specifically, when the rotation amount Rmt of the rotor 105 is equal to or less than the specified amount RmtTh even the first rotation processing of the first time is executed, in the first rotation processing of the second time, a pulse signal Iq'* whose current level is greater than that of the pulse signal Iq'* during the execution of the first rotation processing of the first time may be input in the direction of the estimated q-axis. Then, when the rotation amount Rmt of the rotor 105 accompanying the execution of the first rotation processing of the second time is greater than the specified amount RmtTh, the magnetic pole distinguishing processing is executed. On the other hand, when the rotation amount Rmt of the rotor 105 accompanying the execution of the first rotation processing of the second time is equal to or less than the specified amount RmtTh, the first rotation processing of the third time is executed. In the first rotation processing of the third time, a pulse signal Iq'* whose current level is greater than that of the pulse signal Iq'* during the execution of the first rotation processing of the second time is input in the direction of the estimated q-axis.

When the rotation amount Rmt of the rotor 105 accompanying the execution of the second rotation processing is equal to or less than the specified amount RmtTh, a second rotation processing, in which a pulse signal Iq'* whose current level is greater than that of the pulse signal Iq'* during the execution of the second rotation processing is input in the direction of the estimated q-axis, may be executed again. In this way, when the rotation amount Rmt of the rotor 105 is greater than the specified amount RmtTh by executing the second rotation processing again, the information at this time may be used to determine the rotation direction of the rotor 105 accompanying the execution of the second rotation processing.

In the above embodiment, the change direction of the estimated q-axis high-frequency current Iqh due to the execution of the post-correction processing is acquired as the first information required by executing the post-correction processing, and the rotation direction of the rotor 105 accompanying the execution of the rotation processing is determined based on the first information. Without being limited thereto, the rotation direction of the rotor 105 may be determined based on other information. For example, the positive orientation and the negative orientation of the estimated q-axis high-frequency current Iqh at the start of the post-correction processing, which is the orientation of the current component in the direction of the estimated d-axis at the start of the post-correction processing, may be acquired as the first information acquired by executing the post-correction processing, and the rotation direction of the rotor 105 accompanying the execution of the rotation processing may be determined based on the first information.

Further, the rotation direction determining unit 164 may determine the rotation direction of the rotor 105 based on second information acquired by executing the pre-correction processing and the second information acquired by executing the post-correction processing. For example, a first estimated q-axis high-frequency current, which is the estimated q-axis high-frequency current Iqh at the end of the pre-correction processing, is acquired as second information acquired by executing the pre-correction processing. Further, a second estimated q-axis high-frequency current, which is the estimated q-axis high-frequency current Iqh at the start of the post-correction processing, is acquired as the first information acquired by executing the post-correction processing. In this case, the rotation direction of the rotor 105 is determined based on the second estimated q-axis high-frequency current and the first estimated q-axis high-frequency current.

Figure 6:
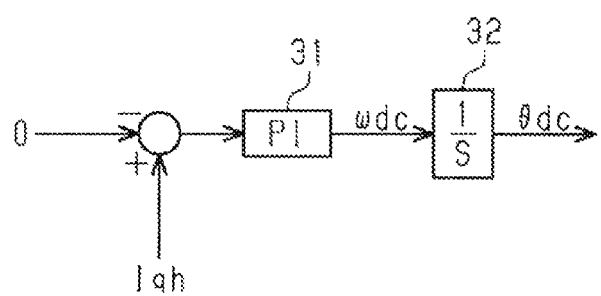
FIG. 6 is a block diagram showing an arithmetic circuit for calculating an estimated rotor speed.

Further, as another method, a first estimated rotor position, which is the position of the rotor 105 at the end of the pre-correction processing, may be acquired as the second information acquired by executing the pre-correction processing, and a second estimated rotor position, which is the position of the rotor 105 at the end of the post-correction processing, may be acquired as the first information acquired by executing the post-correction processing. In this case, the rotation direction of the rotor 105 can be determined by comparing the first estimated rotor position and the second estimated rotor position. As shown in FIG. 6, an estimated rotor position θdc can be acquired by proportionally integrating the estimated q-axis high-frequency current Iqh using a first arithmetic unit 31 to acquire an estimated rotor speed ωdc, and by further integrating the estimated rotor speed ωdc using a second arithmetic unit 32.

The change direction of the estimated q-axis high-frequency current Iqh during the execution of the rotation processing may be acquired, and the rotation direction of the rotor 105 accompanying the execution of the rotation processing may be determined based on the acquired change direction. For example, during the execution of the rotation processing, when the estimated q-axis high-frequency current Iqh changes in a direction in which the estimated q-axis high-frequency current Iqh becomes small, it is determined that the rotor 105 is rotated in the positive rotation direction by executing the rotation processing. On the other hand, during the execution of the rotation processing, when the estimated q-axis high-frequency current Iqh changes in a direction in which the estimated q-axis high-frequency current Iqh becomes large, it is determined that the rotor 105 is rotated in the negative rotation direction by executing the rotation processing.

The post-correction processing may be processing having different contents as described in the above embodiment as long as the direction of the estimated d-axis can be brought closer to the direction of the actual d-axis.

The pre-correction processing may be processing having different contents as described in the above embodiment as long as the direction of the estimated d-axis can be brought closer to the direction of the actual d-axis.

By passing the disturbance voltage signal Vdh* in the direction of the estimated d-axis prior to the execution of the rotation processing, the estimated q-axis high-frequency current Iqh before the execution of the rotation processing can be acquired as a pre-start estimated q-axis high-frequency current. Further, by passing the disturbance voltage signal Vdh* in the direction of the estimated d-axis after the execution of the rotation processing, the estimated q-axis high-frequency current Iqh after the execution of the rotation processing can be acquired as a post-end estimated q-axis high-frequency current. Then, by comparing the post-end estimated q-axis high-frequency current with the pre-start estimated q-axis high-frequency current, the rotation direction of the rotor 105 accompanying the execution of the rotation processing can be determined. Therefore, when the rotation direction of the rotor 105 is to be determined by such a method, the execution of the pre-correction processing may be omitted.

New processing for determining a rotation direction of a rotor may be provided between rotation processing and post-correction processing.

The motor control device 10 may be configured with a circuit including one or more processors that operate according to a computer program (software), one or more dedicated hardware circuits such as dedicated hardware (application-specific integrated circuit: ASIC) that execute at least apart of various processing, or a combination thereof. The processor includes a CPU and a memory such as an RAM and an ROM, and the memory stores program codes or instructions that cause the CPU to execute processing. The memory, that is, a storage medium, includes any available medium that can be accessed by a general-purpose computer or a dedicated computer.

The rotor 105 applied to the brushless motor 100 may be a 4-pole rotor instead of a 2-pole rotor.

The brushless motor to which the motor control device 10 is applied may be a power source of an actuator different from the in-vehicle braking device.

The invention claimed is:

1. A motor control device, comprising:
a rotation control unit configured to rotate a rotor of a brushless motor by supplying power;
a rotation direction determining unit configured to determine a rotation direction of the rotor accompanying the power supplied to the brushless motor by the rotation control unit;
a magnetic pole distinguishing unit configured to distinguish magnetic poles of the rotor at the start of driving the brushless motor by using an orientation of a current flowing through a coil of the brushless motor due to the power supplied to the brushless motor by the rotation control unit and the rotation direction of the rotor determined by the rotation direction determining unit; and
a rotation coordinate setting unit configured to execute pre-correction processing of correcting a direction of an estimated d-axis such that the direction of the estimated d-axis approaches a direction of an actual d-axis before the rotation control unit rotates the rotor, the actual d-axis being a real d-axis of rotation coordinates of vector control, the estimated d-axis being an axis estimated to be a d-axis is in the rotation coordinates,
wherein the pre-correction processing using the rotation coordinate setting unit and the process of rotating the rotor using the rotation control unit are performed continuously, and the magnetic-pole-position is estimated using both processes.

2. The motor control device according to claim 1, wherein the rotation coordinate setting unit is configured to execute post-correction processing of correcting the direction of the estimated d-axis such that the direction of the estimated d-axis approaches the direction of the actual d-axis after the rotation control unit rotates the rotor.

3. The motor control device according to claim 2, wherein the rotation direction determining unit is configured to determine the rotation direction of the rotor by using first information acquired by executing the post-correction processing.

4. The motor control device according to claim 3, wherein the rotation direction determining unit is configured to determine the rotation direction of the rotor by using second information acquired by executing the pre-correction processing and the first information acquired by executing the post-correction processing.

5. The motor control device according to claim 3, wherein when a rotation amount of the rotor is greater than a specified amount, the rotation control unit rotates the rotor in a positive direction,
when the rotation amount of the rotor is equal to or less than the specified amount, the rotation control unit rotates the rotor in an opposite direction opposite the positive direction.

6. The motor control device according to claim 3, wherein when the rotation amount of the rotor is equal to or less than the specified amount, the rotation control unit increases the power supplied to the brushless motor to rotate the rotor.

7. The motor control device according to claim 2, wherein the rotation direction determining unit is configured to determine the rotation direction of the rotor by using second information acquired by executing the pre-correction processing and the first information acquired by executing the post-correction processing.

8. The motor control device according to claim 7, wherein when a rotation amount of the rotor is greater than a specified amount, the rotation control unit rotates the rotor in a positive direction,
when the rotation amount of the rotor is equal to or less than the specified amount, the rotation control unit rotates the rotor in an opposite direction opposite the positive direction.

9. The motor control device according to claim 7, wherein when the rotation amount of the rotor is equal to or less than the specified amount, the rotation control unit increases the power supplied to the brushless motor to rotate the rotor.

10. The motor control device according to claim 2, wherein
when a rotation amount of the rotor is greater than a specified amount, the rotation control unit rotates the rotor in a positive direction,
when the rotation amount of the rotor is equal to or less than the specified amount, the rotation control unit rotates the rotor in an opposite direction opposite the positive direction.

11. The motor control device according to claim 2, wherein
when the rotation amount of the rotor is equal to or less than the specified amount, the rotation control unit increases the power supplied to the brushless motor to rotate the rotor.

12. The motor control device according to claim 1, wherein
when a rotation amount of the rotor is greater than a specified amount, the rotation control unit rotates the rotor in a positive direction,
when the rotation amount of the rotor is equal to or less than the specified amount, the rotation control unit rotates the rotor in an opposite direction opposite the positive direction.

13. The motor control device according to claim 12, wherein
when the rotation amount of the rotor is equal to or less than the specified amount, the rotation control unit increases the power supplied to the brushless motor to rotate the rotor.

14. The motor control device according to claim 1, wherein
when the rotation amount of the rotor is equal to or less than the specified amount, the rotation control unit increases the power supplied to the brushless motor to rotate the rotor.

15. A motor control device, comprising:
a rotation control unit configured to rotate a rotor of a brushless motor by supplying power;
a rotation direction determining unit configured to determine a rotation direction of the rotor accompanying the power supplied to the brushless motor by the rotation control unit;
a magnetic pole distinguishing unit configured to distinguish magnetic poles of the rotor at the start of driving the brushless motor by using an orientation of a current flowing through a coil of the brushless motor due to the power supplied to the brushless motor by the rotation control unit and the rotation direction of the rotor determined by the rotation direction determining unit; and an error determining unit configured to determine whether an error between a direction of an actual d-axis and a direction of an estimated d-axis is being within a predetermined magnetic pole determining permission range, the actual d-axis being a real d-axis of rotation coordinates of vector control, the estimated d-axis being an axis estimated to be a d-axis in the rotation coordinates, wherein the rotation control unit is configured to rotate the rotor, when the error is within the magnetic pole determining permission range, and the magnetic pole distinguishing unit is configured to distinguish the magnetic poles of the rotor by using the orientation of the current and the rotation direction of the rotor when the error is within the magnetic pole determining permission range.

16. The motor control device according to claim 15, further comprising:

a rotation coordinate setting unit configured to execute post-correction processing of correcting a direction of an estimated d-axis such that the direction of the estimated d-axis approaches a direction of an actual d-axis after the rotation control unit rotates the rotor, the actual d-axis being a real d-axis of rotation coordinates of vector control, the estimated d-axis being an axis estimated to be a d-axis is in the rotation coordinates.

17. The motor control device according to claim 15, wherein when a rotation amount of the rotor is greater than a specified amount, the rotation control unit rotates the rotor in a positive direction, when the rotation amount of the rotor is equal to or less than the specified amount, the rotation control unit rotates the rotor in an opposite direction opposite the positive direction.

18. The motor control device according to claim 15, wherein when the rotation amount of the rotor is equal to or less than the specified amount, the rotation control unit increases the power supplied to the brushless motor to rotate the rotor.

* * * * *